US012618001B2

(12) United States Patent
Rybkin et al.

(10) Patent No.: US 12,618,001 B2
(45) Date of Patent: May 5, 2026

(54) ULTRA-LIGHTWEIGHT PROPPANTS

(71) Applicant: Saudi Arabian Oil Company, Dhahran (SA)

(72) Inventors: Iaroslav Rybkin, Moscow (RU); Maxim Orlov, Moscow (RU); Rajendra Arunkumar Kalgaonkar, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 19/069,720

(22) Filed: Mar. 4, 2025

(65) Prior Publication Data

US 2025/0197715 A1    Jun. 19, 2025

Related U.S. Application Data

(62) Division of application No. 17/992,360, filed on Nov. 22, 2022, now Pat. No. 12,264,282.

(51) Int. Cl.
| | |
|---|---|
| *C09K 8/80* | (2006.01) |
| *B01J 13/08* | (2006.01) |
| *C09K 8/70* | (2006.01) |
| *C09K 8/92* | (2006.01) |
| *E21B 43/267* | (2006.01) |

(52) U.S. Cl.
CPC ............... *C09K 8/805* (2013.01); *B01J 13/08* (2013.01); *C09K 8/70* (2013.01); *C09K 8/92* (2013.01); *E21B 43/267* (2013.01); *C09K 2208/04* (2013.01)

(58) Field of Classification Search
CPC . C09K 8/80; C09K 8/805; C09K 8/68; C09K 8/685; C09K 8/70; C09K 8/602; C09K 2208/10; C09K 8/74; E21B 43/267; E21B 43/26
See application file for complete search history.

(56) References Cited

U.S. PATENT DOCUMENTS

2002/0048676 A1 *  4/2002  McDaniel ................. B32B 5/16
                                                                428/407
2019/0023979 A1 *  1/2019  Crews ...................... C09K 8/80

* cited by examiner

*Primary Examiner* — Zakiya W Bates
(74) *Attorney, Agent, or Firm* — Dinsmore & Shohl LLP

(57) ABSTRACT

A system and method for making and using proppant particles includes an exemplary proppant particle which includes a composite of a precipitated polymer matrix and a plant-based material, wherein the precipitated polymer matrix includes a thermoplastic, and wherein the plant-based material includes microparticles.

13 Claims, 4 Drawing Sheets

400

| Grind Plant-Based Material to Form Micron Sized Particles |
| --- |

402

↓

| Dissolve Polymer in a Solvent |
| --- |

404

↓

| Mix Filler into Solvent |
| --- |

406

↓

| Mix Emulsion Stabilizer into Solvent |
| --- |

408

↓

| Inject Phases into Microfluidic Chip |
| --- |

410

↓

| Form Emulsified Solvent Droplets in Precipitating Phase in Microfluidic Chip |
| --- |

412

↓

| Collect Particles of Proppant After Polymer Precipitation |
| --- |

414

ULTRA-LIGHTWEIGHT PROPPANTS

CROSS-REFERENCE TO RELATED APPLICATIONS

This application is a divisional of and claims the benefit of priority to U.S. patent application Ser. No. 17/992,360 filed on Nov. 22, 2022, the contents of which are incorporated by reference herein.

TECHNICAL FIELD

This disclosure relates to methods of producing ultra-lightweight proppants.

BACKGROUND

The completion procedure for low permeability hydrocarbon reservoirs, such as shale oil and shale gas fields, often require hydraulic fracturing to generate fractures to allow hydrocarbon flow. Hydraulic fracturing is initiated by pumping fracturing fluid into wellbore and increasing pressure to sufficiently high level to cause fracturing of the subterranean formation. The fracturing fluid contains proppants, which are used to keep the fracture open and allow flow through the induced fractures for hydrocarbon recovery. In the long term, the use of proppants provides high conductivity and increased production of the well.

Generally, proppants are spherically shaped particles that are characterized by resistance to heat and pressure, price and specific size distribution ranging from microns to millimeters. The choice of proppants is based on the properties of wellbore formation such as closure pressure, and thermal resistance. The materials that are used for preparing proppants include silica, ceramics, glass beads, nutshells, resin coated sands, and bauxites. Based on the composition, the proppants can be prepared using such methods as crushing, sieving, coating, or sintering.

Since proppants resist a high closure pressure, they often have a high-density, as density is often related to mechanical resistance to crushing. As the proppants usually exceed the density of water by a factor of two, the proppants tend to settle out of the fracturing fluid, which decreases the efficiency of the hydraulic fracturing. The fracturing fluids often include additives, or viscosifiers, to increase the viscosity to improve the transport of the proppants into the well by keeping the proppants suspended. However, this increases the power consumption by increasing the load on pumps. Further, the residual materials from the viscosifiers can decrease the permeability of the reservoir rock to hydrocarbon flow.

SUMMARY

An embodiment described herein provides a method for using a composite proppant. The method includes grinding a plant material to form particles, dissolving a polymer in a solvent, mixing the particles into the solvent. The solvent is injected into a microfluidic chip, and the polymer-precipitating phase is injected into the microfluidic chip. Emulsified solvent droplets are formed in the polymer-precipitating phase in the microfluidic chip and particles of the proppant are collected after the polymer has precipitated.

Another embodiment disclosed by examples herein provides a proppant particle. The proppant particle includes a composite of a precipitated polymer matrix and a plant-based material, wherein the precipitated polymer matrix includes a thermoplastic, and wherein the plant-based material includes microparticles.

DETAILED DESCRIPTION

Embodiments described herein provide methods for producing ultra-lightweight (ULW) proppants using a microfluidic system. Decreasing the proppant density will reduce proppant settling, allow the use of lower viscosity fluids, minimize flood loss, and reduce pumping rates, which decreases the risk of unwanted fracturing in the reservoir.

Various types of ULW proppants have been tested, including organic polymer proppants (ULW-1), reinforced composites composed of impregnated nutshells coated with polymers (ULW-2), and porous ceramics coated with resins (ULW-3), among others. A comparison of conventional proppants and these three types of ULW proppants is provided in Table 1. The research results indicate that plant-based filler, for example, composed of strong material such as lignin, cellulose, and hemicellulose, preserve the mechanical strength of proppants without increasing the density. Further, plant-based fillers will have reduced environmental impacts since waste materials can be used.

For the preparation of the ULW proppants using plant-based fillers, particles of the plant-based filler are held or fixed in an attached state. A matrix polymer is an effective solution for holding plant particles in place. As the size of proppants is important to the efficacy, the method used to form the proppants should provide significant control. The microfluidic system is known to offer precise tuning and control of parameters during formation of microspheres and as a result, it ensures a high accuracy of particle sizes during production.

TABLE 1

| | Comparison of general characteristics of conventional and ultra-lightweight proppants | | |
|---|---|---|---|
| Type of proppant | Specific gravity | Closure pressure [PSI] | Temperature [C. °] |
| Frac Sand | 2.66 | 5000 | <200 |
| Ceramic | 2.8 | 10000-12000 | >300 |
| ULW-1* | 1.05 | 8000-10000 | 130-150 |
| ULW-2* | 1.06-1.25 | 4000-8000 | 80-146 |
| ULW-3* | 1.75-2.6 | 2000-10000 | 120-250 |

*ULW-1 are organic polymer proppants; ULW-2 are reinforced composites of nutshells coated with polymers; ULW-3 are porous ceramics coated with polymers Therefore, we aimed to utilize plant-based filler associated with matrix polymer to produce ultra-light weight proppant using a microfluidic system.

Figure 1:
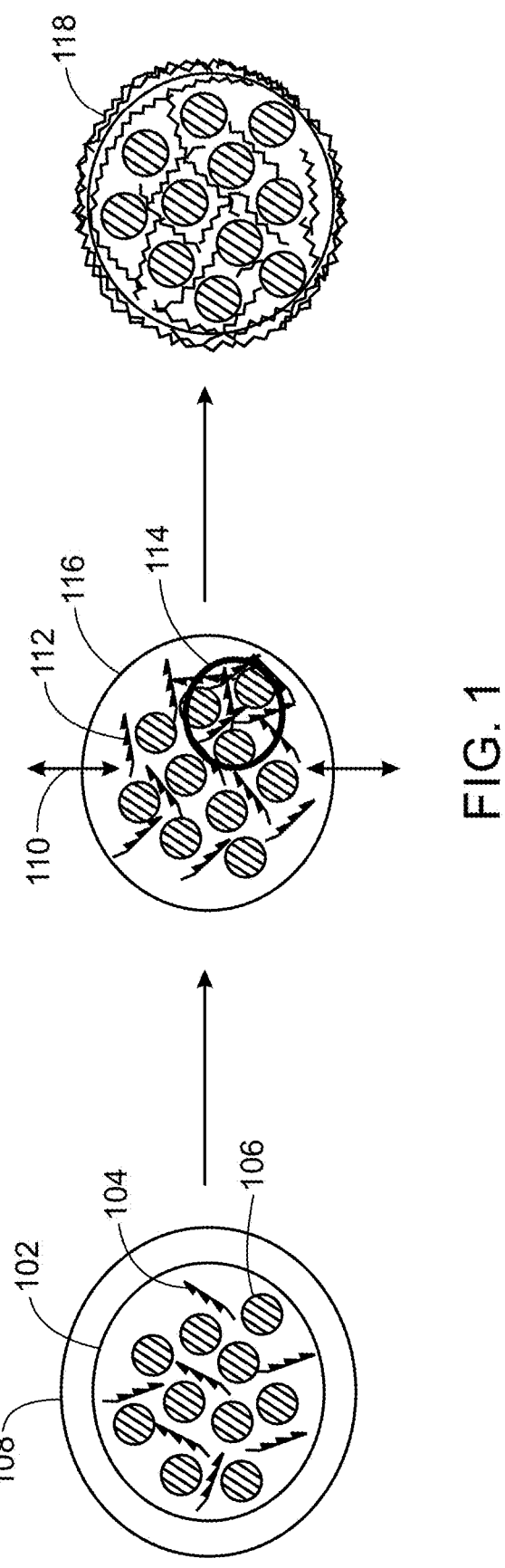
FIG. 1 is a schematic drawing of the formation of a proppant particle from an emulsion.

FIG. 1 is a schematic drawing of the formation 100 of a proppant particle from an emulsion. In the formation, a solvent 102 containing dissolved polymer 104 and plant-based filler 106 is mixed with a precipitating solvent 108, such as an aqueous phase, which results in removal 110 of the solvent phase 102 through diffusion and evaporation. During removal of the solvent 102, the polymer 104 undergoes precipitation to form a matrix polymer 112, which results in the formation of strong particle-polymer associates 114 forming the hardening proppant 116. Once the matrix polymer 112 is fully precipitated, the proppant 118 that is formed can be used, for example, after drying.

In various embodiments, the plant-based filler 106 includes plants, recycled plants, wood, recycled wood, invasive plant species, recycled invasive plant species, recycled bio-based waste, bio-based waste, organic sludge, recycled organic sludge, grass, recycled grass, seeds, recycled seeds, wooden chips, or recycled wooden chips, among others. The plant-based filler 106 can also include plant based-derivatives such as lignin, a lignin derivative, cellulose, a cellulose derivative, hemicellulose, a hemicellulose derivative, starch, a starch derivative, inulin, an inulin derivative, Kraft lignin, or a Kraft lignin derivative, among others.

In various embodiments, an emulsion stabilizer is used to stabilize the formation of an emulsion of the solvent 102 in the precipitating solvent 108. The emulsion stabilizer is a surfactant, including a fatty acid, an amino alcohol, a fatty alcohol, a fatty mercaptan, polyethylene glycol, polypropylene glycol, polyvinyl alcohol, a polysorbate, a fatty acid ester of sorbitol, a fatty acid ester of glycerol, a fatty acid ester of a polyhydroxyl compound, an alkylphenol ethoxylate, an alkyl polyglucoside, a fatty alcohol ethoxylate, an ethoxylated amine, a fatty acid amide, cetrimonium bromide, octenidine dihydrochloride, dioctadecyldimethylammonium bromide, cetylpyridinium chloride, benzalkonium chloride, benzethonium chloride, dimethyldioctadecylammonium chloride, ammonium lauryl sulfate, sodium lauryl sulfate, ammonium dodecyl sulfate, sodium dodecyl sulfate, sodium lauryl ether sulfate, sodium myreth sulfate, dioctyl sodium sulfosuccinate, perfluorobutanesulfonate, an alkyl-aryl ether phosphate, an alkyl ether phosphate, an alkyl aryl sulfonate, an alkyl benzene sulfonate, an alkyl sulfate, an N-ethoxy sulfonate, a sodium dodecyl sulfate, an alcohol propoxy sulfate, an alkyl ethoxy sulfate, an alpha-olefin sulfonate, an alpha-olefin sulfate, a branched alkyl benzene sulfonate, docusate sodium, an ethoxy glycidyl sulfonate, a propoxy glycidyl sulfonate, an alkyl ether sulfate, an internal olefin sulfonate, a sulfonated ethoxylated alcohol, a sulfonated ethoxylated alkyl phenol, a sodium petroleum sulfonate, an alkyl alcohol propoxylated sulfate, an alkyl phenol, a monoglyceride, a diglyceride, guar gum, canola oil, lecithin, carrageenan, or ammonium phosphatide, or derivatives thereof, among others.

In various embodiments, the matrix polymer 112 is a thermoplastic polymers, including poly(methyl methacrylate), polymethacrylate, poly(lactic-co-glycolic acid), polyester, polyethylene terephthalate, poly(styrene-isoprene), polybromostyrene, polyethylene, polyphenylene oxide, polyether sulfone, acrylonitrile butadiene styrene, polycarbonate, polyhydroxyalkanoate, polyhydroxybutyrate, polylactic acid, polyurethane, polyvinyl chloride, a poly(methyl methacrylate) based copolymer, a polymethacrylate based copolymer, a poly(lactic-co-glycolic acid) based copolymer, a polyester based copolymer, a polyethylene terephthalate based copolymer, a polystyrene based copolymer, a poly (styrene-isoprene) based copolymer, a polybromostyrene based copolymer, a polyethylene based copolymer, a polyphenylene oxide based copolymer, a polyether sulfone based copolymer, an acrylonitrile butadiene styrene based copolymer, a polycarbonate based copolymer, a polyhydroxyalkanoate based copolymer, a polyhydroxybutyrate based copolymer, a polylactic acid based copolymer, a polyurethane based copolymer, a polyvinyl chloride based copolymer, styrene-acrylate copolymers, a polyamide, a polyamide based copolymer, a polyether, a polyether based copolymer, a polyimide, a polyimide based copolymer, a polyolefin, a polyolefin based copolymer, polypropylene-polyethylene copolymers, an ethylene-vinylacetate copolymer, a polyacrylic acid, a polyacrylic acid based copolymer, a polyacrylate, a polyacrylate based copolymer, propylene-acrylate copolymer, propylene-methacrylate copolymers, oxidized polypropylene, oxidized polyethylene, propylene-ethylene oxide copolymers, or acrylonitrile-butadiene-styrene copolymers, among others.

In various embodiments, the solvent 102 for the polymer 104 is an organic solvent, including dichloromethane, dichloroethane, acetone, butanone, acetic acid, cyclopentane, ethyl acetate, carbon disulfide, N,N-dimethylformamide, ethanol, isopropanol, propanol, formaldehyde, chloroform, carbon tetrachloride, a hexane, a heptane, an octane, benzene, toluene, acetonitrile, 1,4-dioxane, dimethyl sulfide, tetrahydrofuran, or diethyl ether, among others.

Figure 2:
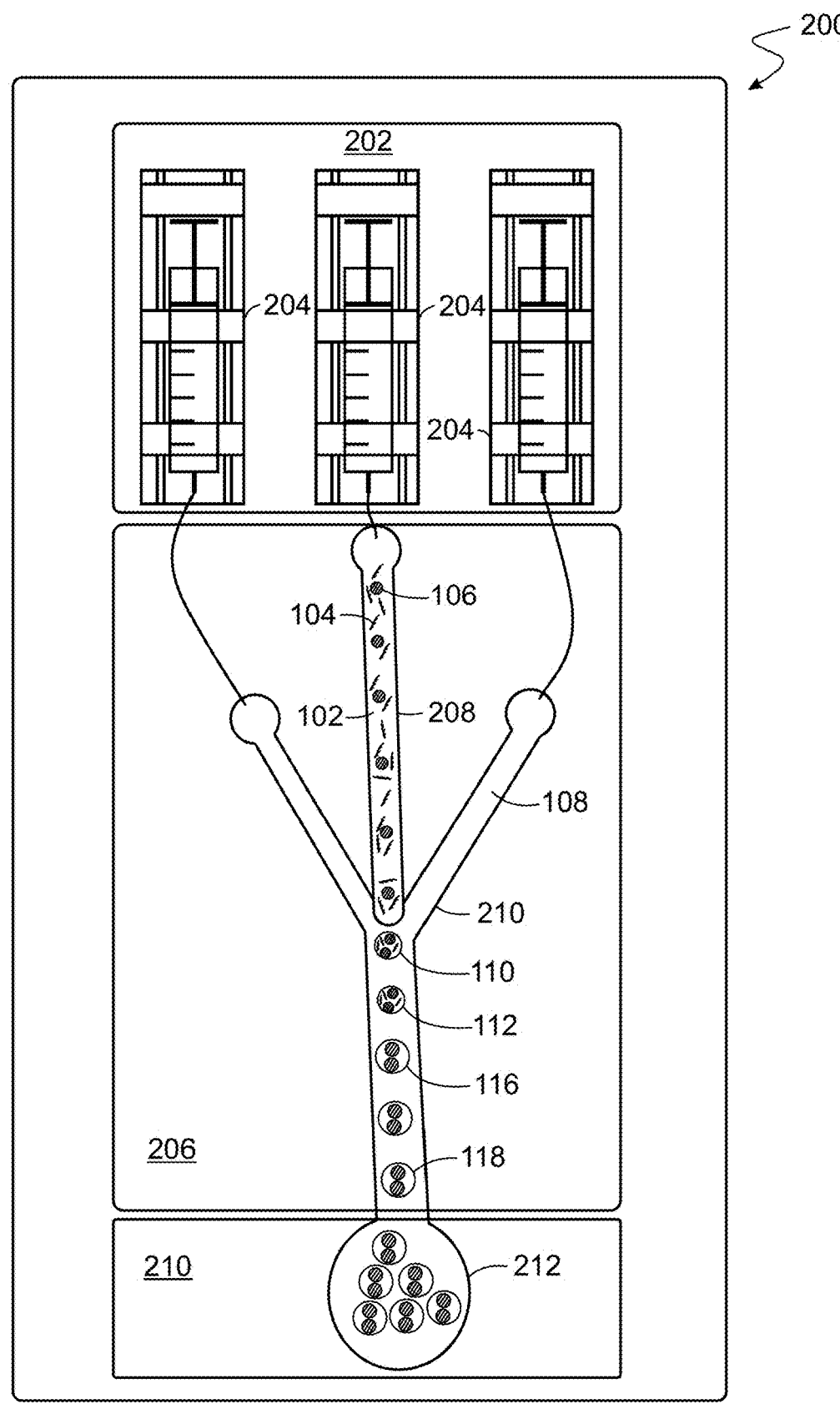
FIG. 2 is a schematic drawing of a microfluidic system for forming proppant particles using a microfluidic chip.

FIG. 2 is a schematic drawing of a microfluidic system 200 for forming proppant particles 118 using a microfluidic chip 202. Like numbered items are as described with respect to FIG. 1. The microfluidic system 200 includes pumps 202, such as syringe pumps 204 or gas driven pumps, and a microfluidic chip 206. In some embodiments, the microfluidic system 200 has a temperature control system to maintain the conditions for production, such as a heater to increase the rate of diffusion of the solvent 102 or promote evaporation of the solvent 102. Each pump 204 has a feed rate control unit. In some embodiments, at least one pump 204 has a mixer to incorporate the particles of the plant-based filler 106. The operation of the pumps 202 can be synchronized to maintain a constant supply of components within the microfluidic chip 206.

As described herein, the plant-based filler 106 is ground and then sieved to control particle size, form a uniform particle size, or both. The determination of the particle size may be made based on the diameter of a channel 208 of the microfluidic chip 206. For example, if the channel 208 of the microfluidic chip has a diameter of about 500 μm, a particle size limit of about 400 μm may be selected to prevent plugging.

The solvent 102 that includes the polymer 104 and the plant-based filler 106 is injected into the channel 208. A nozzle at the end of the channel 208 injects droplets of the solvent 102, carrying the plant-based filler 106 and the polymer 104, into the flow of the precipitating solvent 108. As the solvent 102 is removed 110 from the droplets, the polymer 102 forms a matrix polymer 112 that holds the plant-based filler 106, forming a hardening proppant particle 116. Further precipitation forms the proppant 118, which exits the microfluidic chip 206 to an isolation unit 210. In the isolation unit, a capture vessel 212 is used to collect the proppant 118. From there, the proppant 118 can be dried before final use.

Figure 3:
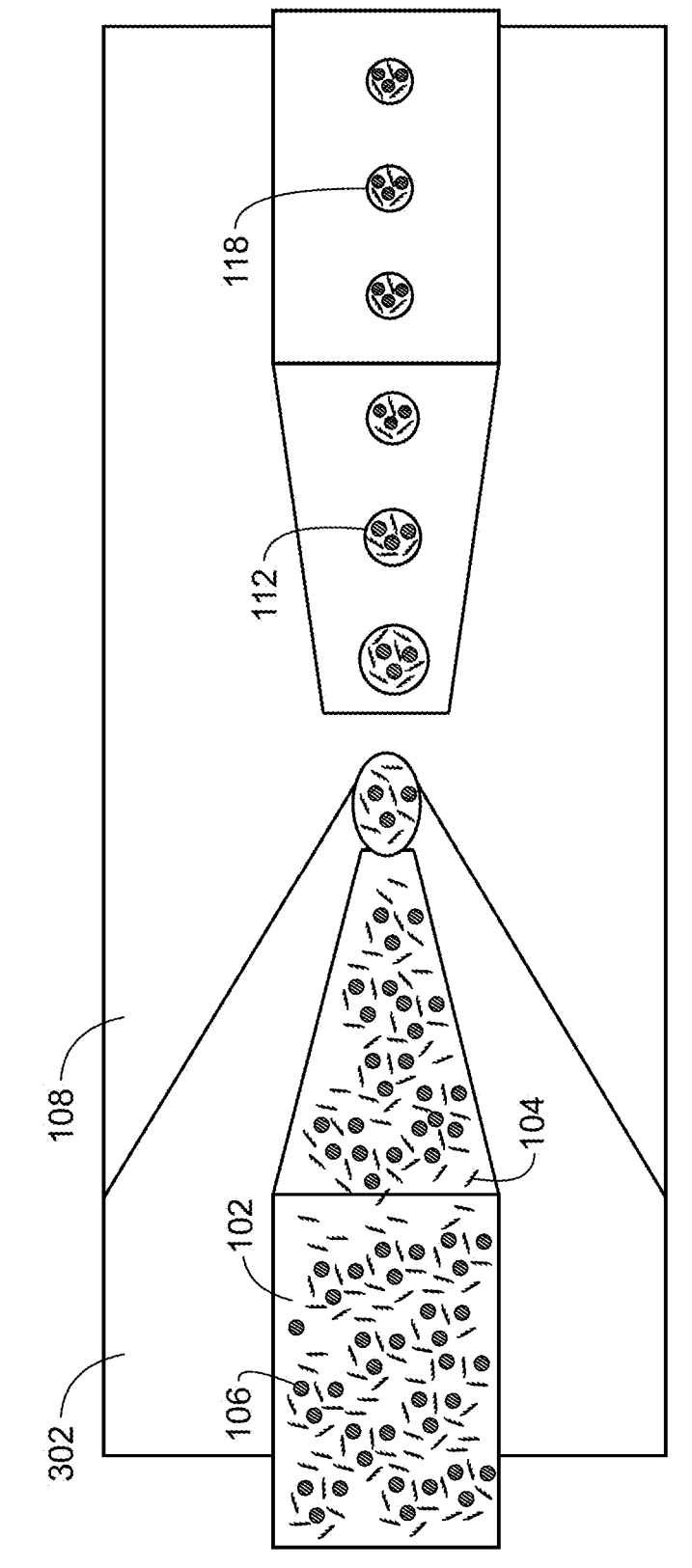
FIG. 3 is an alternative configuration of the microfluidic chip.

FIG. 3 is an alternative configuration of a microfluidic chip 300 that can be used to form the proppant 118. Like numbered items are as described with respect to FIG. 1. In this microfluidic chip 300, a third solvent system 302 can be introduced to improve the precipitation of the proppant 118, enhance the control of the size of the proppant 118, and the like. For example, the solvent 102 can include an organic solvent as described with respect to FIG. 1, and a precipitating solvent 108 to start the precipitation, while the third solvent system 302 includes the emulsion stabilizer to enhance the formation of the emulsion. Any number of other combinations of solvents may be used to control the precipitation of the proppant 118 in this configuration.

Figure 4:
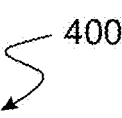
FIG. 4 is a block diagram of a method for making a proppant particle using a microfluidic system.

FIG. 4 is a block diagram of a method for hundred for making a proppant particle using a microfluidic system. The method begins at block 402, with the grinding of the plant-based material to form micron-sized particles. The particles are then sieved to provide a substantially uniform size range. For example, the particles may be in a range of about 10 μm to about 2 mm, about 20 μm to about 1 mm, or about 50 μm to 500 μm. In some embodiments, the particles may be in a range of 20% of a central value, for example if the central value is about 100 μm, the particles may range in size from about 80 μm to about 120 μm. The micron-sized sieved particles can undergo grinding and sieving several times to achieve a target size and range. In various embodiments, the concentration of the plant-based filler 106 is between about 0% w/v (g/100 mL) and about 35% w/v. For example, the concentration of the plant-based filler can be 1% w/v, or 28% w/v. The most optimal concentration of plant-based filler in proppant is about 5% to 15% w/v.

At block 404, the polymer is dissolved in the solvent phase. In some embodiments, the matrix polymer is prepared from a mixture of dissolved polymers, which can form mechanically stronger alloys.

At block 406, the plant-based filler is added to the solvent. The plant-based filler is dispersed using mechanical agitation to form a substantially uniform suspension.

At block 408, the emulsion stabilizer is added to the solvent. In some embodiments, such as described with respect to FIG. 3, the emulsion stabilizer is added to a separate solvent. For example, the emulsion stabilizer may be added to the precipitating solvent, a third solvent, or both. In these embodiments, the plant-based filler can be added to the phases containing the polymer and the stabilizer or to a phase only containing the polymer.

At block 410, the phases are then introduced into the microfluidic chip using pumps. The mixing can be done using either miscible or immiscible phases inside the microfluidic chip. At the channel junction of the microfluidic chip, for example, at a nozzle, the phases are mixed.

At block 412, solvent drops are formed in the precipitating phase in the microfluidic chip. Emulsified solvent drops can be formed during mixing of immiscible phases. As used herein, an emulsion is a fine dispersion of one liquid in another in which it is not soluble or miscible. The emulsion includes any number of droplet sizes, including sub-micron emulsified droplets, micron sized emulsified droplets, and suspensions of larger size droplets. An emulsion can be a discontinuous oil phase in a continuous water phase (O/W) or a discontinuous oil phase in a continuous oil phase (O/O). The emulsion can be even more complex with an internal phase itself being a dispersion, such as a O/W/O type of emulsions. The precipitation of the polymers in the emulsions can occur in the water phase, the oil phase, or the interphase between water and oil phases, more than one of the above phases or in all the above phases. For example, the solvent can diffuse out of and emulsified solvent droplet, the polymer can precipitate.

At block 414, the proppant is collected after the precipitation. Before use, the proppant may be dried to remove any traces of solvent left, which may increase the hardness of the proppant.

The final proppant may be suspended in a fracturing fluid, such as an aqueous-based fracturing fluid. The fracturing fluid is injected under pressure into a reservoir to create fractures. As the fractures are created, the fracturing fluid carries the proppant in the fractures.

EMBODIMENTS

An embodiment described herein provides a method for using a composite proppant. The method includes grinding a plant material to form particles, dissolving a polymer in a solvent, mixing the particles into the solvent. The solvent is injected into a microfluidic chip, and the polymer-precipitating phase is injected into the microfluidic chip. Emulsified solvent droplets are formed in the polymer-precipitating phase in the microfluidic chip and particles of the proppant are collected after the polymer has precipitated.

In an aspect, the method includes mixing an emulsion stabilizer into the solvent prior to injection into the microfluidic chip. In an aspect, the method includes mixing an emulsion stabilizer into the aqueous phase prior to injection into the microfluidic chip.

In an aspect, the plant material includes nutshells, wood, recycled wood, invasive plant species, recycled invasive plant species, recycled bio-based waste, bio-based waste, organic sludge, recycled organic sludge, grass, recycled grass, seeds, recycled seeds, wooden chips, or recycled wooden chips, or any combination thereof. In an aspect, the plant material includes lignin, a lignin derivative, cellulose, a cellulose derivative, hemicellulose, a hemicellulose derivative, starch, a starch derivative, inulin, an inulin derivative, Kraft lignin, or a Kraft lignin derivative, or any combination thereof.

In an aspect, the polymer includes a thermoplastic polymer. In an aspect, the polymer includes poly(methyl methacrylate), polymethacrylate, poly(lactic-co-glycolic acid), polyester, polyethylene terephthalate, poly(styrene-isoprene), polybromostyrene, polyethylene, polyphenylene oxide, polyether sulfone, acrylonitrile butadiene styrene, polycarbonate, polyhydroxyalkanoate, polyhydroxybutyrate, polylactic acid, polyurethane, polyvinyl chloride, a poly(methyl methacrylate) based copolymer, a polymethacrylate based copolymer, a poly(lactic-co-glycolic acid) based copolymer, a polyester based copolymer, a polyethylene terephthalate based copolymer, a polystyrene based copolymer, a poly(styrene-isoprene) based copolymer, a polybromostyrene based copolymer, a polyethylene based copolymer, a polyphenylene oxide based copolymer, a polyether sulfone based copolymer, an acrylonitrile butadiene styrene based copolymer, a polycarbonate based copolymer, a polyhydroxyalkanoate based copolymer, a polyhydroxybutyrate based copolymer, a polylactic acid based copolymer, a polyurethane based copolymer, a polyvinyl chloride based copolymer, styrene-acrylate copolymers, a polyamide, a polyamide based copolymer, a polyether, a polyether based copolymer, a polyimide, a polyimide based copolymer, a polyolefin, a polyolefin based copolymer, polypropylene-polyethylene copolymers, an ethylene-vinylacetate copolymer, a polyacrylic acid, a polyacrylic acid based copolymer, a polyacrylate, a polyacrylate based copolymer, propylene-acrylate copolymer, propylene-methacrylate copolymers, oxidized polypropylene, oxidized polyethylene, propylene-ethylene oxide copolymers, or acrylonitrile-butadiene-styrene copolymers, or any combination thereof.

In an aspect, the solvent includes dichloromethane, dichloroethane, acetone, butanone, acetic acid, cyclopentane, ethyl acetate, carbon disulfide, N,N-dimethylformamide, ethanol, isopropanol, propanol, formaldehyde, chloroform, carbon tetrachloride, hexane, heptane, octane, benzene, toluene, acetonitrile, 1,4-dioxane, dimethyl supplied, tetrahydrofuran, or diethyl ether, or a combination thereof.

In an aspect, an emulsion stabilizer is added to stabilize the emulsion. In an aspect, the emulsion stabilizer includes a surfactant. In an aspect, the emulsion stabilizer includes a fatty acid, an amino alcohol, a fatty alcohol, a fatty mercaptan, polyethylene glycol, polypropylene glycol, polyvinyl alcohol, a polysorbate, a fatty acid ester of sorbitol, a fatty acid ester of glycerol, a fatty acid ester of a polyhydroxyl compounds, an alkylphenol ethoxylate, an alkyl polyglucoside, a fatty alcohol ethoxylate, an ethoxylated amine, a fatty acid amide, cetrimonium bromide, octenidine dihydrochloride, dioctadecyldimethylammonium bromide, cetylpyridinium chloride, benzalkonium chloride, benzethonium chloride, dimethyldioctadecylammonium chloride, ammonium lauryl sulfate, sodium lauryl sulfate, ammonium dodecyl sulfate, sodium dodecyl sulfate, sodium lauryl ether sulfate, sodium myreth sulfate, dioctyl sodium sulfosuccinate, perfluorobutanesulfonate, an alkyl-aryl ether phosphate, an alkyl ether phosphate, an alkyl aryl sulfonate, an alkyl benzene sulfonate, an alkyl sulfate, an N-ethoxy sulfonate, a sodium dodecyl sulfate, an alcohol propoxy sulfate, an alkyl ethoxy sulfate, an alpha-olefin sulfonate, an alpha-olefin sulfate, a branched alkyl benzene sulfonate, docusate sodium, an ethoxy glycidyl sulfonate, a propoxy glycidyl sulfonate, an alkyl ether sulfate, an internal olefin sulfonate, a sulfonated ethoxylated alcohol, a sulfonated ethoxylated alkyl phenol, a sodium petroleum sulfonate, an alkyl alcohol propoxylated sulfate, an alkyl phenol, a monoglyceride, a diglyceride, guar gum, canola oil, lecithin, carrageenan, or ammonium phosphatide, or derivatives thereof, or any combination thereof.

In an aspect, the method includes drying the proppant.

In an aspect, the method includes suspending the proppant in a fracturing fluid, and injecting the fracturing fluid into a formation to prop open fractures.

Another embodiment disclosed by examples herein provides a proppant particle. The proppant particle includes a composite of a precipitated polymer matrix and a plant-based material, wherein the precipitated polymer matrix includes a thermoplastic, and wherein the plant-based material includes microparticles.

In an aspect, the microparticles of the plant-based material are between about 10 µm to about 2 mm. in an aspect, the plant-based material includes nutshells, wood, recycled wood, invasive plant species, recycled invasive plant species, recycled bio-based waste, bio-based waste, organic sludge, recycled organic sludge, grass, recycled grass, seeds, recycled seeds, wooden chips, or recycled wooden chips, or any combination thereof. In an aspect, the plant-based material includes lignin, a lignin derivative, cellulose, a cellulose derivative, hemicellulose, a hemicellulose derivative, starch, a starch derivative, inulin, an inulin derivative, Kraft lignin, or a Kraft lignin derivative, or any combination thereof.

In an aspect, the thermoplastic includes poly(methyl methacrylate), polymethacrylate, poly(lactic-co-glycolic acid), polyester, polyethylene terephthalate, poly(styrene-isoprene), polybromostyrene, polyethylene, polyphenylene oxide, polyether sulfone, acrylonitrile butadiene styrene, polycarbonate, polyhydroxyalkanoate, polyhydroxybutyrate, polylactic acid, polyurethane, polyvinyl chloride, a poly(methyl methacrylate) based copolymer, a polymethacrylate based copolymer, a poly(lactic-co-glycolic acid) based copolymer, a polyester based copolymer, a polyethylene terephthalate based copolymer, a polystyrene based copolymer, a poly(styrene-isoprene) based copolymer, a polybromostyrene based copolymer, a polyethylene based copolymer, a polyphenylene oxide based copolymer, a polyether sulfone based copolymer, an acrylonitrile butadiene styrene based copolymer, a polycarbonate based copolymer, a polyhydroxyalkanoate based copolymer, a polyhydroxybutyrate based copolymer, a polylactic acid based copolymer, a polyurethane based copolymer, a polyvinyl chloride based copolymer, styrene-acrylate copolymers, a polyamide, a polyamide based copolymer, a polyether, a polyether based copolymer, a polyimide, a polyimide based copolymer, a polyolefin, a polyolefin based copolymer, polypropylene-polyethylene copolymers, an ethylene-vinyl-lacetate copolymer, a polyacrylic acid, a polyacrylic acid based copolymer, a polyacrylate, a polyacrylate based copolymer, propylene-acrylate copolymer, propylene-methacrylate copolymers, oxidized polypropylene, oxidized polyethylene, propylene-ethylene oxide copolymers, or acrylonitrile-butadiene-styrene copolymers, or any combination thereof.

In an aspect, the precipitated polymer matrix includes an emulsion stabilizer. In an aspect, the emulsion stabilizer includes a surfactant. In an aspect, the emulsion stabilizer includes a fatty acid, an amino alcohol, a fatty alcohol, a fatty mercaptan, polyethylene glycol, polypropylene glycol, polyvinyl alcohol, a polysorbate, a fatty acid ester of sorbitol, a fatty acid ester of glycerol, a fatty acid ester of a polyhydroxyl compounds, an alkylphenol ethoxylate, an alkyl polyglucoside, a fatty alcohol ethoxylate, an ethoxylated amine, a fatty acid amide, cetrimonium bromide, octenidine dihydrochloride, dioctadecyldimethylammonium bromide, cetylpyridinium chloride, benzalkonium chloride, benzethonium chloride, dimethyldioctadecylammonium chloride, ammonium lauryl sulfate, sodium lauryl sulfate, ammonium dodecyl sulfate, sodium dodecyl sulfate, sodium lauryl ether sulfate, sodium myreth sulfate, dioctyl sodium sulfosuccinate, perfluorobutanesulfonate, an alkyl-aryl ether phosphate, an alkyl ether phosphate, an alkyl aryl sulfonate, an alkyl benzene sulfonate, an alkyl sulfate, an N-ethoxy sulfonate, a sodium dodecyl sulfate, an alcohol propoxy sulfate, an alkyl ethoxy sulfate, an alpha-olefin sulfonate, an alpha-olefin sulfate, a branched alkyl benzene sulfonate, docusate sodium, an ethoxy glycidyl sulfonate, a propoxy glycidyl sulfonate, an alkyl ether sulfate, an internal olefin sulfonate, a sulfonated ethoxylated alcohol, a sulfonated ethoxylated alkyl phenol, a sodium petroleum sulfonate, an alkyl alcohol propoxylated sulfate, an alkyl phenol, a monoglyceride, a diglyceride, guar gum, canola oil, lecithin, carrageenan, or ammonium phosphatide, or derivatives thereof, or any combination thereof.

Other implementations are also within the scope of the following claims.

What is claimed is:
1. A method for using a composite proppant, comprising:
grinding a plant material to form particles;
dissolving a polymer in a solvent;
mixing the particles into the solvent;
injecting the solvent into a microfluidic chip;
injecting a polymer precipitating phase into the microfluidic chip;
forming emulsified solvent droplets in the polymer precipitating phase in the microfluidic chip; and
collecting particles of proppant after the polymer has precipitated.
2. The method of claim 1, further comprising mixing an emulsion stabilizer into the solvent prior to injection into the microfluidic chip.

3. The method of claim 1, further comprising mixing an emulsion stabilizer into an aqueous phase prior to injection into the microfluidic chip.

4. The method of claim 1, wherein the plant material comprises nutshells, wood, recycled wood, invasive plant species, recycled invasive plant species, recycled bio-based waste, bio-based waste, organic sludge, recycled organic sludge, grass, recycled grass, seeds, recycled seeds, wooden chips, or recycled wooden chips, or any combination thereof.

5. The method of claim 1, wherein the plant material comprises lignin, a lignin derivative, cellulose, a cellulose derivative, hemicellulose, a hemicellulose derivative, starch, a starch derivative, inulin, an inulin derivative, Kraft lignin, or a Kraft lignin derivative, or any combination thereof.

6. The method of claim 1, wherein the polymer comprises a thermoplastic polymer.

7. The method of claim 1, wherein the polymer comprises poly(methyl methacrylate), polymethacrylate, poly(lactic-co-glycolic acid), polyester, polyethylene terephthalate, poly(styrene-isoprene), polybromostyrene, polyethylene, polyphenylene oxide, polyether sulfone, acrylonitrile butadiene styrene, polycarbonate, polyhydroxyalkanoate, polyhydroxybutyrate, polylactic acid, polyurethane, polyvinyl chloride, a poly(methyl methacrylate) based copolymer, a polymethacrylate based copolymer, a poly(lactic-co-glycolic acid) based copolymer, a polyester based copolymer, a polyethylene terephthalate based copolymer, a polystyrene based copolymer, a poly(styrene-isoprene) based copolymer, a polybromostyrene based copolymer, a polyethylene based copolymer, a polyphenylene oxide based copolymer, a polyether sulfone based copolymer, an acrylonitrile butadiene styrene based copolymer, a polycarbonate based copolymer, a polyhydroxyalkanoate based copolymer, a polyhydroxybutyrate based copolymer, a polylactic acid based copolymer, a polyurethane based copolymer, a polyvinyl chloride based copolymer, styrene-acrylate copolymers, a polyamide, a polyamide based copolymer, a polyether, a polyether based copolymer, a polyimide, a polyimide based copolymer, a polyolefin, a polyolefin based copolymer, polypropylene-polyethylene copolymers, an ethylene-vinylacetate copolymer, a polyacrylic acid, a polyacrylic acid based copolymer, a polyacrylate, a polyacrylate based copolymer, propylene-acrylate copolymer, propylene-methacrylate copolymers, oxidized polypropylene, oxidized polyethylene, propylene-ethylene oxide copolymers, or acrylonitrile-butadiene-styrene copolymers, or any combination thereof.

8. The method of claim 1, wherein the solvent comprises dichloromethane, dichloroethane, acetone, butanone, acetic acid, cyclopentane, ethyl acetate, carbon disulfide, N,N-dimethylformamide, ethanol, isopropanol, propanol, formaldehyde, chloroform, carbon tetrachloride, hexane, heptane, octane, benzene, toluene, acetonitrile, 1,4-dioxane, dimethyl sulfide, tetrahydrofuran, or diethyl ether, or a combination thereof.

9. The method of claim 1, further comprising adding an emulsion stabilizer to stabilize the emulsion.

10. The method of claim 9, wherein the emulsion stabilizer comprises a surfactant.

11. The method of claim 9, wherein the emulsion stabilizer comprises a fatty acid, an amino alcohol, a fatty alcohol, a fatty mercaptan, polyethylene glycol, polypropylene glycol, polyvinyl alcohol, a polysorbate, a fatty acid ester of sorbitol, a fatty acid ester of glycerol, a fatty acid ester of a polyhydroxyl compounds, an alkylphenol ethoxylate, an alkyl polyglucoside, a fatty alcohol ethoxylate, an ethoxylated amine, a fatty acid amide, cetrimonium bromide, octenidine dihydrochloride, dioctadecyldimethylammonium bromide, cetylpyridinium chloride, benzalkonium chloride, benzethonium chloride, dimethyldioctadecylammonium chloride, ammonium lauryl sulfate, sodium lauryl sulfate, ammonium dodecyl sulfate, sodium dodecyl sulfate, sodium lauryl ether sulfate, sodium myreth sulfate, dioctyl sodium sulfosuccinate, perfluorobutanesulfonate, an alkylaryl ether phosphate, an alkyl ether phosphate, an alkyl aryl sulfonate, an alkyl benzene sulfonate, an alkyl sulfate, an N-ethoxy sulfonate, a sodium dodecyl sulfate, an alcohol propoxy sulfate, an alkyl ethoxy sulfate, an alpha-olefin sulfonate, an alpha-olefin sulfate, a branched alkyl benzene sulfonate, docusate sodium, an ethoxy glycidyl sulfonate, a propoxy glycidyl sulfonate, an alkyl ether sulfate, an internal olefin sulfonate, a sulfonated ethoxylated alcohol, a sulfonated ethoxylated alkyl phenol, a sodium petroleum sulfonate, an alkyl alcohol propoxylated sulfate, an alkyl phenol, a monoglyceride, a diglyceride, guar gum, canola oil, lecithin, carrageenan, or ammonium phosphatide, or derivatives thereof, or any combination thereof.

12. The method of claim 1, further comprising drying the proppant.

13. The method of claim 1, further comprising:
suspending the proppant in a fracturing fluid; and
injecting the fracturing fluid into a formation to prop open fractures.

* * * * *